(12) United States Patent
Clegg et al.

(10) Patent No.: US 6,356,946 B1
(45) Date of Patent: Mar. 12, 2002

(54) SYSTEM AND METHOD FOR SERIALIZING JAVA OBJECTS IN A TUBULAR DATA STREAM

(75) Inventors: David Lyndon Clegg, Walnut Creek; Adarsh Ratan Pannu, Fremont, both of CA (US)

(73) Assignee: Sybase Inc., Emeryville, CA (US)

( * ) Notice: Subject to any disclaimer, the term of this patent is extended or adjusted under 35 U.S.C. 154(b) by 0 days.

(21) Appl. No.: 09/233,365

(22) Filed: Jan. 19, 1999

Related U.S. Application Data

(60) Provisional application No. 60/098,973, filed on Sep. 2, 1998.

(51) Int. Cl.$^7$ ............................................... G06F 13/00
(52) U.S. Cl. ..................... 709/231; 709/315; 707/10; 707/100; 707/103 R
(58) Field of Search ...................... 709/315, 203, 709/231; 707/103, 103 R, 10, 100

(56) References Cited

U.S. PATENT DOCUMENTS

| | | | | |
|---|---|---|---|---|
| 4,249,241 A | | 2/1981 | Aberle et al. | 710/200 |
| 4,809,168 A | | 2/1989 | Hennessy et al. | 709/104 |
| 5,857,197 A | * | 1/1999 | Mullins | 707/103 |
| 5,913,028 A | * | 6/1999 | Wang et al. | 709/203 |
| 5,944,781 A | | 8/1999 | Murray | 709/202 |
| 6,035,303 A | * | 3/2000 | Baer et al. | 707/103 |
| 6,125,400 A | * | 9/2000 | Cohen et al. | 709/247 |
| 6,128,621 A | * | 10/2000 | Weisz | 707/103 |
| 6,266,666 B1 | * | 7/2001 | Ireland et al. | 707/10 |

OTHER PUBLICATIONS

Date, C.J., An Introduction to Database Systems, Ch 1: Overview of Database Management, vol. 1, 5th Ed., 1990.
Dreystadt, J., "Storing Java in a Relational Database," BYTE, Jun. 1998, pp. 61–62.

* cited by examiner

Primary Examiner—Kenneth R. Coulter
(74) Attorney, Agent, or Firm—John A. Smart (57) ABSTRACT

A distributed (e.g., client/server) computing environment is described which implements protocol methodology simplifying the use of objects in distributed applications. In particular, the methodology facilitates streaming to clients executable objects (e.g., Java objects) stored and managed remotely (e.g., objects stored and managed in relational databases), so that the objects may be executed or otherwise manipulated locally at the clients. The methodology is implemented by extending an existing streaming protocol to support a "chunked" datatype; within a data stream, the system can have individual data items which are themselves streams of indeterminate length. This streaming data type is an undifferentiated data type or simply a "BLOB" (i.e., binary large object). Using the BLOB extension, the system provides a set of BLOB subtypes which take advantage of existing object streaming mechanism (e.g., Java streaming) but convey additional information in the form of self-describing metadata. The metadata contains all necessary information on the BLOB data for clients and servers to narrow the BLOB data itself to the appropriate subtype and extract the semantically correct values from it. In this manner, the system may employ the streaming protocol to receive requests and input objects and, in response thereof, generate and send output objects and output result sets with rows and columns that may include objects in them, or send back output stored procedure parameters that may be objects.

45 Claims, 4 Drawing Sheets

SYSTEM AND METHOD FOR SERIALIZING JAVA OBJECTS IN A TUBULAR DATA STREAM

RELATED APPLICATIONS

The present application claims the benefit of priority from and is related to the following commonly-owned U.S. provisional application: application serial No. 60/098,973, entitled SYSTEM AND METHOD FOR SERIALIZING JAVA OBJECTS IN A TABULAR DATA STREAM, filed Sep. 2, 1998. The disclosure of the foregoing application is hereby incorporated by reference in its entirety, including any appendices or attachments thereof, for all purposes.

COMPUTER PROGRAM LISTING APPENDIX

A Computer Program Listing Appendix, containing one (1) file on compact disc, is included with this application.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to data access and processing in a distributed computing system and, more particularly, to a system implementing methodology for improving data streaming of objects in distributed computer environments.

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Well-known examples of computer networks include local-area networks (LANs) where the computers are geographically close together (e.g., in the same building), and wide-area networks (WANs) where the computers are farther apart and are connected by telephone lines or radio waves.

Often, networks are configured as "client/server" networks, such that each computer on the network is either a "client" or a "server." Servers are powerful computers or processes dedicated to managing shared resources, such as storage (i.e., disk drives), printers, modems, or the like. Servers are often dedicated, meaning that they perform no other tasks besides their server tasks. For instance, a database server is a computer system that manages database information, including processing database queries from various clients. The client part of this client-server architecture typically comprises PCs or workstations which rely on a server to perform some operations. Typically, a client runs a "client application" that relies on a server to perform some operations, such as returning particular database information. Often, client-server architecture is thought of as a "two-tier architecture," one in which the user interface runs on the client or "front end" and the database is stored on the server or "back end." The actual business rules or application logic driving operation of the application can run on either the client or the server (or even be partitioned between the two). In a typical deployment of such a system, a client application, such as one created by an information service (IS) shop, resides on all of the client or end-user machines. Such client applications interact with host database engines (e.g., Sybase® Adaptive Server™), executing business logic which traditionally ran at the client machines.

More recently, the development model has shifted from standard client/server or two-tier development to a three-tier (or n-tier), component-based development model. This newer client/server architecture introduces three well-defined and separate processes, each typically running on a different platform. A "first tier" provides the user interface, which runs on the user's computer (i.e., the client). Next, a "second tier" provides the functional modules that actually process data. This middle tier typically runs on a server, often called an "application server." A "third tier" furnishes a database management system (DBMS) that stores the data required by the middle tier. This tier may run on a second server called the database server.

The three-tier design has many advantages over traditional two-tier or single-tier designs. For example, the added modularity makes it easier to modify or replace one tier without affecting the other tiers. Separating the application functions from the database functions makes it easier to implement load balancing. Thus, by partitioning applications cleanly into presentation, application logic, and data sections, the result will be enhanced scalability, reusability, security, and manageability.

In a typical client/server environment, the client knows about the database directly and can submit a database query for retrieving a result set which is generally returned as a tabular data set. In a three-tier environment, particularly a component-based one, the client never communicates directly with the database. Instead, the client typically communicates through one or more components. Components themselves are defined using one or more interfaces, where each interface is a collection of methods. In general, components return information via output parameters. In the conventional, standard client/server development model, in contrast, information is often returned from databases in the form of tabular result sets, via a database interface such as Open Database Connectivity (i.e., ODBC, available from Microsoft Corp. of Redmond, Washington) or Java Database Connectivity (i.e., JDBC, available from Sun Microsystems of Mountain View, California). A typical three-tier environment would, for example, include a middle tier comprising business objects implementing business rules (logic) for a particular organization. The business objects, not the client, communicates with the database.

For their part, application writers or developers like to write object-oriented programs using modern object-oriented programming techniques. At the same time, however, these developers prefer to have their data (i.e., the data employed by the application) stored in a database having relational tables, as that is an easy way of storing and retrieving data. A particular problem arises when one wants to retrieve data from the database for use (e.g., manipulation) within one's program: how is this "flat" data converted into objects. In this regard, "object" refers to the specific programming construct that defines associated data members and methods (typically, including data hiding and containment), such as an object instantiated from a C++ class, a Java class, an Object Pascal class, or the like.

Today, there are products available to perform object/relational mapping of that nature. Typically, such products operate as an additional, add-in tool that, after examination of the underlying table(s), builds corresponding wrappers for achieving a degree of object/relational mapping. As a simple example, given an employee table, such a tool might, for instance, display a user interface facilitating the creation of an employee C++ class definition for use in the user's application code. One approach, for example, would be to generate public members that correspond to table columns, with perhaps some automated checking of business rules.

The foregoing approach is disadvantageous, however. For instance, since the approach is not well integrated with the underlying database system, the user is not able to manipulate objects using functionality that is otherwise available to the database system. For example, the user is not able to employ an SQL query having a predicate that refers to the objects, including individual fields and methods of those objects. As another problem, present-day tools still require a fair degree of manual intervention by the user. Thus, although such tools provide graphical user interfaces (GUI) for assisting with the task of browsing table definitions and constructing associated objects (e.g., by assisting with object definitions during code generation), such an approach still requires the user to manually assist in carrying out object mappings. As another problem, current object/relational mapping tools provide little or no inter-operability. Once the user has selected a particular tool, he or she will likely have to "stick" with that tool for the duration of program development. If the schema of the underlying database changes, the client applications created as a result of that tool will likely be broken, or at least require significant modification.

What is instead desired is the ability to create objects, particularly Java objects, in one's application and store those objects within tables, or locate an object created by another application and retrieve it into one's application for local processing. In other words, developers want the ability to manipulate such objects locally, instead of having to operate on such objects (particularly, database objects) at a distance, such as using proprietary extensions to SQL. Specifically, developers want the ability to bring database objects to the clients, in result sets, as database cursors, as stored procedure output parameters, and the like, for local manipulation. The present invention fulfills this and other needs.

SUMMARY OF THE INVENTION

A distributed (e.g., client/server) computing environment is described which, in accordance with the present invention, simplifies the use of objects in distributed applications. In particular, the invention provides methodology for streaming to clients objects (e.g., Java objects) stored and managed remotely (e.g., objects stored and managed in relational databases), so that the objects may be executed or otherwise manipulated locally at the clients.

The present invention may be implemented by taking an existing streaming protocol, such as Sybase Tabular Data Stream (TDS) protocol or other comparable streaming protocol, and extending it in the following manner. The protocol is extended to include a "chunked" data type, so that within a data stream the system can have individual data items which are themselves streams of indeterminate length. This streaming data type is an undifferentiated data type or simply a "BLOB" (i.e., binary large object). Using the BLOB extension, the system provides a set of BLOB subtypes which take advantage of existing object streaming mechanism (e.g., Java streaming) but convey additional information in the form of self-describing metadata (which precedes all TDS data types). This extended metadata is present in ROW_FORMAT (i.e., row format) and PARAM_FORMAT (i.e., parameter format) tokens. This metadata contains all necessary information on the BLOB data for clients and servers to narrow the BLOB data itself to the appropriate subtype and extract the semantically correct values from it.

One of the BLOB subtypes is defined as JAVA_OBJECT1. Here, the BLOB data contains the serialized value of a Java Object using the Java version 1 serialization format (as defined by Sun Microsystems, of Mountain View, California). Additionally, the capabilities of the existing negotiation part of the login sequence is extended so that the client and server sides of a TDS connection can be sure when it is appropriate to send JAVA_OBJECT1 data. In this manner, client and server products can now use this extended version of a tabular streaming protocol to exchange serialized Java Objects as parameters or row data.

An improved method of the present invention for allowing a client to retrieve an executable object stored in a database table residing on a database server, embodied in a system comprising a computer network having a database server and a client, includes the following steps. The system provides a streaming protocol for effecting communication between the client and the database server, wherein the protocol supports streaming of an undifferentiated data type, and wherein the protocol provides subtypes providing metadata that conveys additional information for extracting an executable object from a stream. A request is received from the client for retrieving information from the database server, where the request includes a request to transport to the client a particular executable object stored at the database table. In response to the request, the system operates to retrieve a result set from the database server corresponding to the requested particular executable object and stream the result set to the client; the result set includes the particular executable object together with corresponding metadata. Upon receipt of the result set at the client, the metadata is used for recreating at the client a local copy of the particular executable object.

DETAILED DESCRIPTION OF A PREFERRED EMBODIMENT

The following description will focus on the presently-preferred embodiment of the present invention, which is operative in a distributed computing environment executing application programs which interact with remote data, such as that which is stored on an SQL database server. The present invention, however, is not limited to any particular application or environment. Instead, those skilled in the art will find that the present invention may be advantageously applied to any application or environment where optimization of object data access and processing is desirable, including non-SQL database management systems and the like. The following description is, therefore, for the purpose of illustration and not limitation.

Standalone System Hardware

Figure 1A:
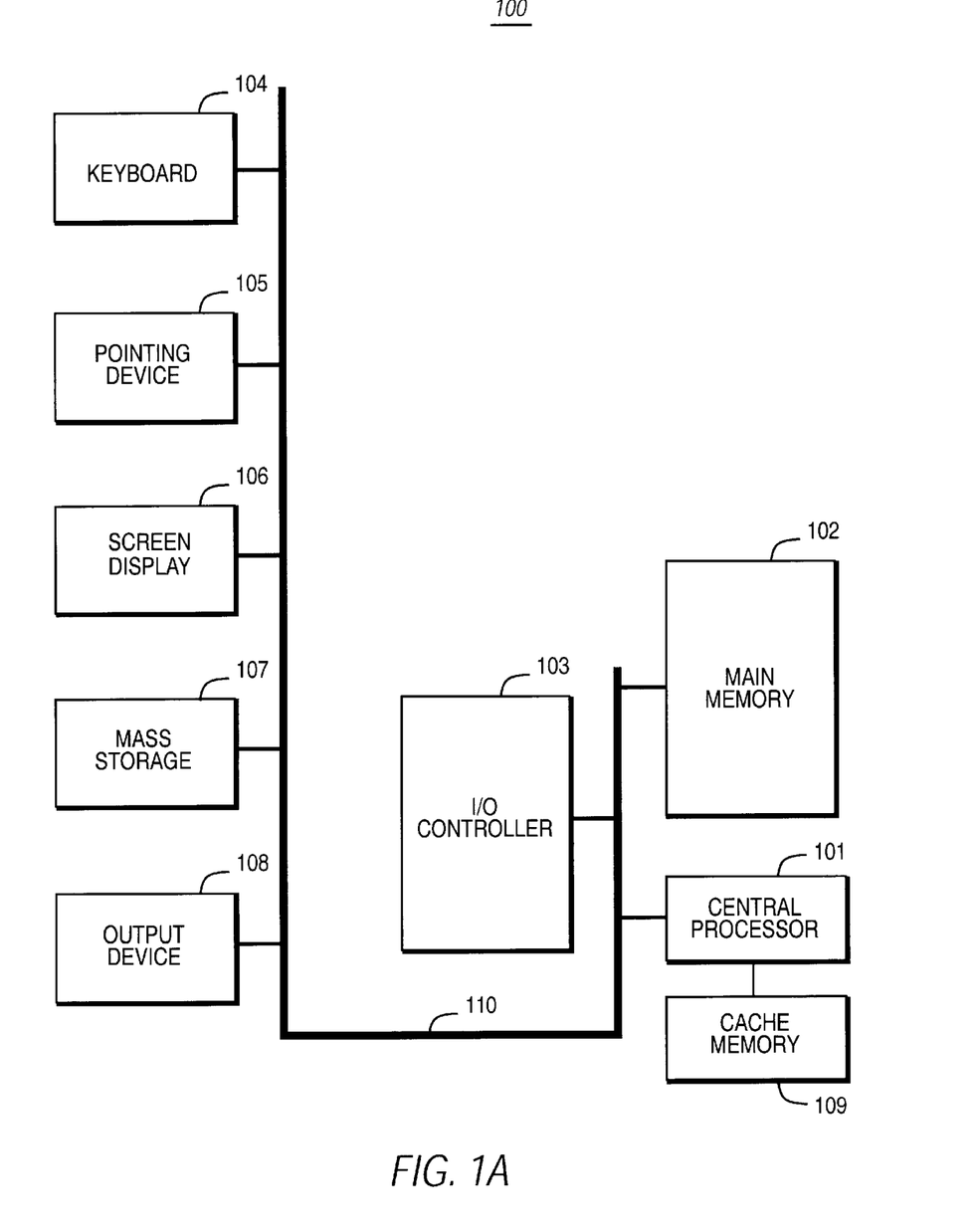
FIG. 1A is a block diagram of a computer system in which the invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, removable disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
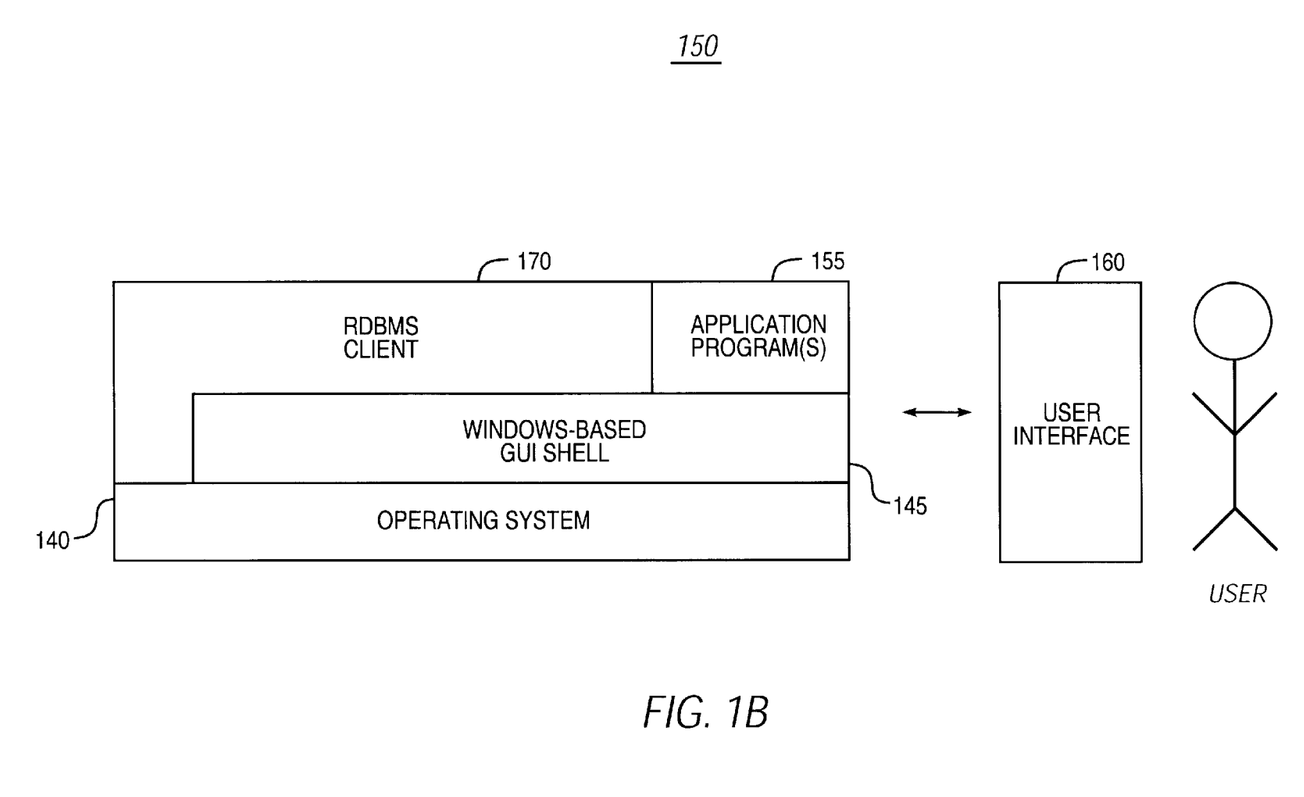
FIG. 1B is a block diagram of a computer software system provided for directing the operation of the computer system of FIG. 1A.

Illustrated in FIG. 1B, a computer software system 150 is provided for directing the operation of the computer system 100. Software system 150, which is stored in system memory 102 and on mass storage or disk memory 107, includes a kernel or operating system (OS) 140 and a windows-based GUI (graphical user interface) shell 145. One or more application programs, such as application software programs 155, may be "loaded" (i.e., transferred from storage 107 into memory 102) for execution by the system 100. The system also includes a user interface 160 for receiving user commands and data as input and displaying result data as output.

Also shown, the software system 150 includes a Relational Database Management System (RDBMS) front-end or "client" 170. The RDBMS client 170 may be any one of a number of database front-ends, including PowerBuilder™, Sybase PowerJ™, PowerC++™, Borland Paradox®, Microsoft® Access, or the like, and the front-end may include SQL access drivers (e.g., Sybase JConnect™ JDBC driver or the like) for accessing database tables from an SQL database server operating in a Client/Server environment.

Client/Server Database Management System

Figure 2:
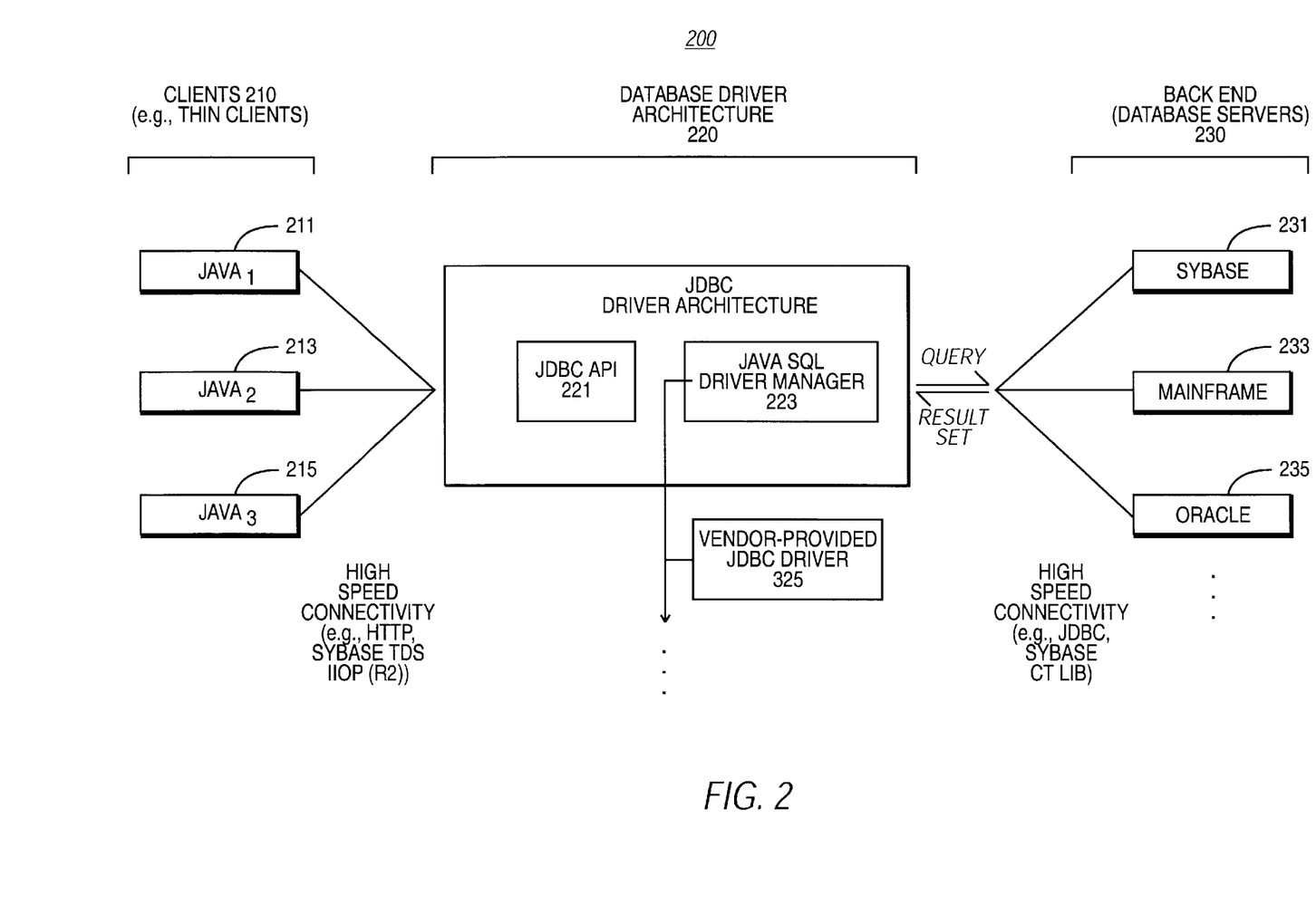
FIG. 2 is a block diagram illustrating the general structure of a distributed computing environment suitable for implementing the present invention.

While methods of the present invention may operate within a single (standalone) computer (e.g., system 100 of FIG. 1A), the present invention is preferably embodied in a distributed computer environment, such as illustrated in FIG. 2. Distributed computing environment 200 includes JDBC-enabled client application(s) 210 (e.g., clients 211, 213, 215), connect to a back-end database server(s) 230 (e.g., servers 231, 233, 235) via a Database Driver architecture 220. Database Driver architecture 220 itself includes a Java SQL driver interface 221 and manager 223 (e.g., the Java SQL driver manager provided by Sun Microsystems), for managing one or more JDBC drivers, such as JDBC driver 325 (i.e., Sybase JConnect™ JDBC driver provided by Sybase, Inc.). In an exemplary embodiment, the Clients may themselves include thin-client applications (e.g., Java programs) running on standalone workstations, dumb terminals, or personal computers (PCs), such as the above-described system 100. Typically, such units would operate under a client operating system such as Microsoft Windows 9x for PC clients. Each Back End Server, such as Sybase® SQL Server™, now Sybase® Adaptive Server™ (available from Sybase, Inc. of Emeryville, Calif.) in an exemplary embodiment, generally operates as an independent process (i.e., independently of the Clients), running under a server operating system such as Microsoft Windows NT (Microsoft Corp. of Redmond, Wash.), NetWare (Novell of Provo, Utah), UNIX (Novell), or OS/2 (IBM). Here, the components of the system communicate over a network which may be any one of a number of conventional network systems, including a Local Area Network (LAN) or Wide Area Network (WAN), as is known in the art (e.g., using Ethernet, IBM Token Ring, or the like). The network includes functionality for packaging client calls in the well-known SQL (Structured Query Language) together with any parameter information into a format (of one or more packets) suitable for transmission across a cable or wire, for delivery to the database servers.

Client/server environments, database servers, and networks are well documented in the technical, trade, and patent literature. For a discussion of database servers and client/server environments generally, and SQL Server™ particularly, see, e.g., Nath, A., *The Guide to SQL Server*, Second Edition, Addison-Wesley Publishing Company, 1995. Additional documentation of SQL Server™ is available from Sybase, Inc. as *SQL Server Documentation Set* (Catalog No. 49600). The disclosures of each of the foregoing are hereby incorporated by reference.

Serializing Java Objects in a Tabular Data Stream

A. Introduction: Tabular data stream

It is known in the art to employ a communication protocol for effecting communication between database components, such as between a client front end and a database server back end. Typically, such communication protocols include native support for traditional SQL (e.g., ANSI SQL-92) data types, such as character (char), variable-length character (vchar), binary (blob), date-time, time stamp, together with some support for vendor-specific data types.

One example is Sybase® "Tabular Data Stream" which provides a communication protocol for effecting communication between Sybase-branded database products. Tabular Data Stream (TDS) is an application-level protocol used to send requests and responses between clients and servers. A client's request may contain multiple commands. The response from the server may return one or many result sets. TDS relies on a connection-oriented transport service. Session, presentation, and application service elements are provided by TDS. Since TDS does not require any specific transport provider, it can be implemented over multiple transport protocols if they provide connection-oriented service. TDS provides support for login capability negotiation, authentication services, and support for both database specific and generic client commands. Responses to client commands are returned using a self-describing, table-oriented protocol. Column name and data type information is returned to the client before the actual data is returned.

The TDS protocol is mostly a token-based protocol where the contents of a Protocol Data Unit (PDU) are tokenized. The token and its data stream describe a particular command or part of a result set returned to a client. For example, there is a token called TDS_LANGUAGE which is used by a client to send language, typically SQL, commands to a server. There is also a token called TDS_ROWFMT which describes the column name, status, and data type which is used by a server to return column format information to a client. The TDS protocol is half-duplex. A client writes a complete request and then reads a complete response from the server. Requests and responses cannot be intermixed and multiple requests cannot be outstanding.

A TDS request or response may span multiple PDUs. The size of the PDU sent over the transport connection is negotiated at dialog establishment time. Each PDU contains a header, which is usually followed by data. A PDU header contains information about the size and contents of the PDU as well as an indication if it is the last PDU in a request or response.

As an illustration of this protocol, consider, for example, the SQL statement: "select name from sysobjects where id<3". The following will illustrate a high-level description of the TDS tokens exchanged by a client and a server to establish a dialog and then execute a simple SQL query. The query causes two table rows to be returned to the client. The client first requests a transport connection to the server and then sends a login record to establish a dialog. The login record contains capability and authentication information.

| Client | Server |
|---|---|
| login packet → | |
| ← | TDS_LOGINACK |
| ← | TDS_DONE |

Now that a dialog has been established between the client and the server, the client sends the SQL query to the server and then waits for the server to respond.

| Client | Server |
|---|---|
| LANGUAGE: "select name . . ." → | |

The server executes the query and returns the results to the client. First the data columns are described by the server, followed by the actual row data. A completion token follows the row data indicating that all row data associated with the query has been returned to the client.

| Client | Server |
|---|---|
| ← | TDS_ROWFMT row description |
| ← | TDS_ROW row data |
| ← | TDS_ROW row data |
| ← | TDS_DONE |

Although the above-described communication protocol is employed in the preferred embodiment, the present invention may be implemented using any comparable data streaming protocol. Regardless of the communication protocol employed, the protocol is extended in accordance with the present invention to support object-based data types, such as Java objects, thus allowing these objects to become full class SQL objects.

B. Serialization-Specific Architecture

As described above, the system of the present invention includes one or more clients connected, typically through database drivers, to a database server which manages a database comprising a plurality of database tables. At its core (i.e., at its engine level), the database server includes a run-time Tabular Data Stream (TDS) library that is responsible for streaming of data, including object types. In response to queries (e.g., SQL queries) from clients, the database server returns an appropriate result set. More particularly, a handle to the result set table is passed to the TDS run-time library for streaming the result set out to the appropriate client(s). A corresponding run-time TDS module resides at the client side (e.g., embodied in a client-side JDBC driver) for receiving the stream and correctly processing the objects as they are extracted from the stream. Thus in this manner, the system may employ the streaming protocol to receive requests and input objects and, in response thereof, generate and send output objects and output result sets with rows and columns that may include objects in them, or send back output stored procedure parameters that may be objects. Consider, for instance, a query that retrieves a set of rows, such as an SQL SELECT query. When streaming the result to the client, the stream first includes a row format description. This information is encoded as a variable-length TDS token that describes for each column what its type is, together with any additional information about it.

C. Support for Storing Java Objects as Column Data in a Table

1. General

SQL databases may be modified to directly store Java objects as column data in a database. In this manner, the user is able to create queries (e.g., in SQL) that has predicates that refer to individual objects, including their individual fields and methods, in an extended form of SQL. In a database, Java classes are treated as data types, and a column can be declared with a Java class as its data type. The corresponding JDBC access driver supports storing Java objects in a database by implementing setObject() methods and getObject() methods. This makes it possible to use the JDBC driver with an application that uses native JDBC classes and methods to directly store and retrieve Java objects as column data. The following describes the requirements and procedures for storing objects in a table and retrieving them using the JDBC driver in the system of the present invention.

2. Prerequisites for Storing Java Objects As Column Data

In order to store Java objects belonging to a user-defined Java class in a column, the following requirements should be met. First, the class should implement the java.io.Serializable interface. This is because the JDBC driver in a preferred embodiment employs the native Java serialization and deserialization to send objects to a database and receive them back from the database. Second, the class definition should be installed in the destination database. Finally, the client system should have the class definition in a .class file that is accessible through the local CLASSPATH environment variable.

3. Sending a Java Object to a Database

To send an instance of a user-defined class as column data, one employs one of the following setObject( ) methods, as specified in the PreparedStatement interface:

```
    void setObject(int parameterindex, Object x, int
        targetSqlType, int scale) throws SQLException;
    void setObject(int parameterIindex, Object x, int
        targetSqlType) throws SQLException;
    void setObject(int parameterIndex, Object x) throws
        SQLException;
```
The following example defines an Address class, shows the definition of a "Friends" table that has an Address column whose data type is the Address class, and inserts a row into the table.

```
public class Address implements Serializable
{
public String streetNumber;
public String street;
public String apartmentNumber;
public String city;
public int zipCode;
//Methods
. . .
}
Friends table:
varchar(30) firstname,
varchar(30) lastname,
Address address,
varchar(15) phone)
// Connect to the database containing the Friends table.
Connection conn =
    DriverManager.getConnection("jdbc:sybase:Tds:localhost:5000",
    "username", "password");
// Create a Prepared Statement object with an insert statement
//for updating the Friends table.
PreparedStatement ps = conn.prepareStatement("INSERT INTO Friends
    values (?,?,?,?)");
// Now, set the values in the prepared statement object, ps.
// set firstname to "Joan."
ps.setString(1, "Joan");
// Set last name to "Smith."
ps.setString(2, "Smith");
// Assuming that we already have "Joan_address" as an instance
// of Address, use setObject(int parameterIndex, Object x, int //
targetSqlType) to set the address column to "Joan_address."
// Note that the targetSqlType is java.sql.types.JAVA_OBJECT, with a //
designated integer value of "2000."
ps.setObject(3, Joan_address, 2000);
// Set the phone column to Joan's phone number.
ps.setString(4, "123-456-7890");
// Perform the insert.
ps.executeUpdate( );
```

4. Receiving a Java Object from the Database

A client JDBC application can receive a Java object from the database in a result set or as the value of an output parameter returned from a stored procedure. If a result set contains a Java object as column data, one may employ the following getObject( ) methods in the ResultSet interface to assign the object to a class variable.

Object getObject(int columnIndex) throws SQLException;
    Object getObject(String columnName) throws SQLException;

If an output parameter from a stored procedure contains a Java object, one may employ the following getObject( ) method in the CallableStatement interface to assign the object to a class variable.

Object getobject(int parameterIndex) throws SQLException;

The following example illustrates the use of ResultSet.getObject(int columnIndex) to assign an object received in a result set to a class variable. The example uses the Address class and Friends table of the previous section and presents a simple application that prints a name and address on an envelope.

```
/*
** This application takes a first and last name, gets the
** specified person's address from the Friends table in the
** database, and addresses an envelope using the name and
** retrieved address.
*/
public class Envelope
{
Connection conn = null;
String firstName = null;
String lastName = null;
String street = null;
String city = null;
String zip = null;
public static void main(String[ ] args)
{
if (args.length < 2)
{
    System.out.println("Usage: Envelope <firstName>
        <lastName>");<lastName>");
    System.exit(1);
}
// create a 4" x 10" envelope
Envelope e = new Envelope(4, 10);
try
{
    // connect to the database with the Friends table.
    conn = DriverManager.getConnection{
    "jdbc:sybase:Tds:localhost:5000", "username",
    "password");
    // look up the address of the specified person
    firstName = args[0];
    lastName = args[1];
    PreparedStatement ps = conn.prepareStatement(
        "SELECT address FROM friends WHERE " +
    "firstname = ? AND lastname = ?");
    ps.setString(1, firstName);
    ps.setString(2, lastName);
    ResultSet rs = ps.executeQuery( );
    if (rs.next( ))
    {
        Address a = (Address) rs.getObject(1);
        // set the destination address on the envelope
        e.setAddress(firstName, lastName, a);
    }
    conn.close( );
}
catch (SQLException sqe)
{
    sqe.printStackTrace ( );
    System.exit(2);
}
// if everything was successful, print the envelope
e.print( );
}
private void setAddress(String fname, String lname, Address a)
{
    street = a.streetNumber + " " + a.street + " " +
    a.apartmentNumber;
    city = a.city;
    zip = "" + a.zipCode;
}
private void print( )
{
    // Print the name and address on the envelope.
    . . .
}
}
```

D. Supporting Object Serialization

The present invention provides an object streaming approach that serves as a container or wrapper data type that is convenient for streaming objects, including serving as a more efficient means for sending text and image data. Consider, for instance, the task of recording a scene using a digital camcorder and storing the recording (i.e., the sequence of images) thereof in a database, such as a database residing on a network. Presently, such generated image information must first be buffered at the client (here, the camcorder), for transmission later to the database. Simply put, present-day approaches do not allow real-time streaming of objects, such as across a network, for storage in a database. The present invention, however, provides long char and long binary data types supporting such functionality.

A chief design consideration adopted in the approach of the present invention is that any new data type introduced for streaming objects, such as Java objects, should remain open and flexible. This is important so that the data type is preserved for future use with other object types, including complex data structures such as a column containing a structured data type stored in it. At the same time, however, the new objects will employ the same basic mechanism to stream objects. Here, the approach adopted includes flexibility in defining what type of object the object is and how it is formatted (i.e., what is the meaningful content). At the per row level—streams of object row data—object inheritance hierarchies and subtyping are accommodated. Moreover, the data type should be flexible enough to accommodate future, more-efficient serialization and compression schemes, so that the underlying system may remain optimized for available network bandwidth.

Figure 3:
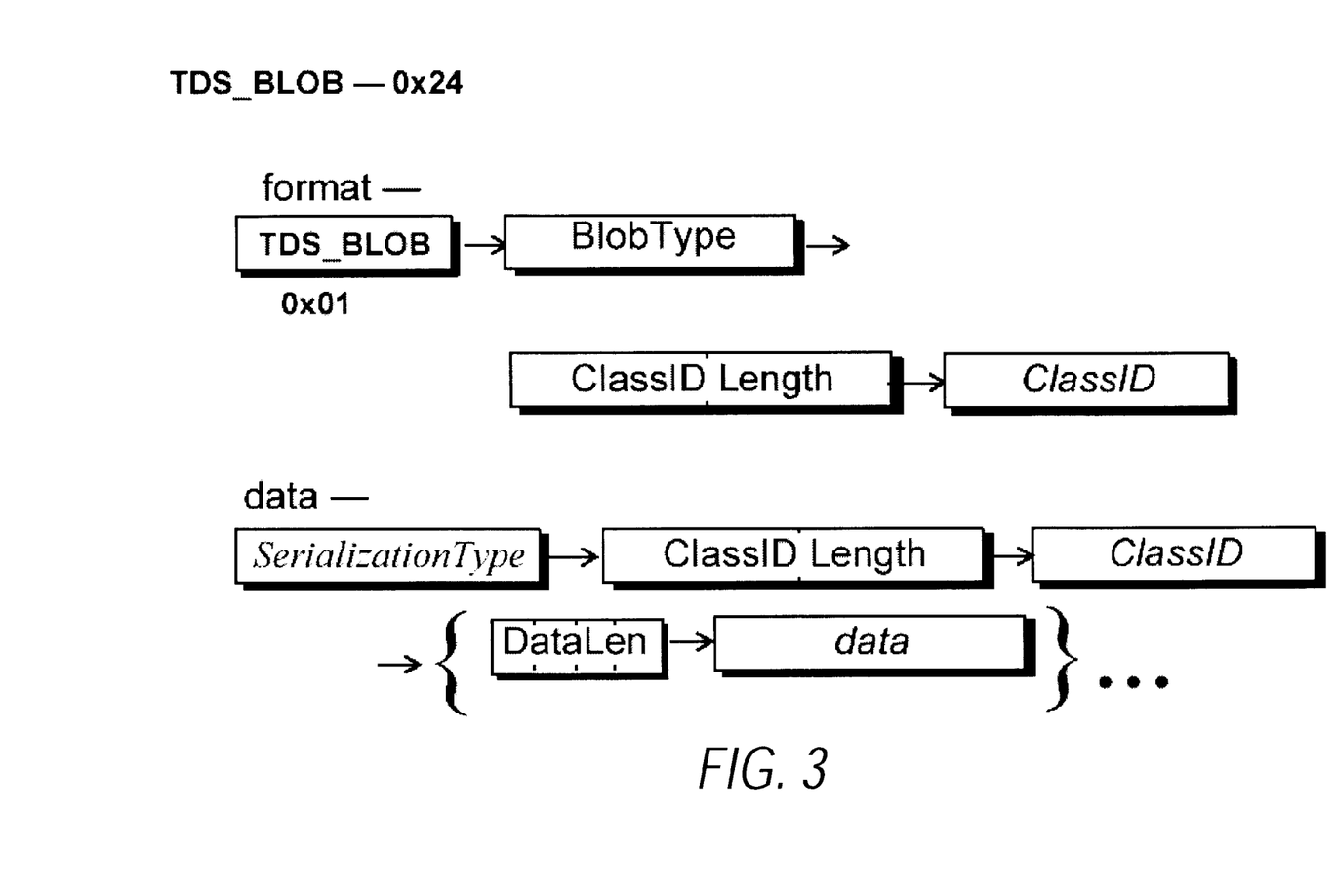
FIG. 3 is a block diagram illustrating a new streaming/chunked data type that may be employed to represent a serialized object, or a long binary or character data type.

As illustrated in FIG. 3, the present invention introduces a new streaming/chunked data type that may be employed to represent a serialized object, or a long binary or character data type. Here, the BlobType indicates what type of serialized data this is. Valid BlobType values include the following.

TABLE 1

| BlobType | ClassID meaning |
|---|---|
| 0x01 | The fully qualified name of the class ("com.foo.Bar"). This is a Character String in the negotiated TDS character set currently in use on this connection. |
| 0x02 | A 4-byte integer (database ID) 4-byte integer (sysextypes number of this class definition in this database). Both integers are in the byte-ordering negotiated for this connection. |
| 0x03 | This is long character data and has no ClassID associated with it. |
| 0x04 | This is long binary data and has no ClassID associated with it. |

The ClassIDLength field indicates how long the next ClassID byte array is. If this value is 0, then the ClassID field will be absent. The ClassID byte array identifies the type of object which the column was declared to contain. All rows in that column are subclasses of this Class. How this ClassID should be interpreted depends on the BlobType value. In the case of Java objects using Native serialization, ClassID may be missing since the serialization internally contains the name of the Class which each object is an instance of.

The SerializationType indicates how the members of the object are actually represented in the following data field. SerializationType meanings depend on the BlobType and are summarized as follows.

TABLE 2

| BlobType | Serialization | Meaning |
|---|---|---|
| 0x01, 0x02 | 0x01 | Native Java Serialization |
| 0x03 | 0x00 | Characters are in their native format, the character set of the data is the same as that of all other character data as negotiated on the connection during login. |

TABLE 2-continued

| BlobType | Serialization | Meaning |
|---|---|---|
| 0x03 | 0x02 | Character data is Reuters Compression Scheme for Unicode (RCSU) compressed. This serialization allows I18N character data to be moved over a TDS connection which is otherwise using some other character set which would not support a no-loss conversion. |
| 0x04 | 0x00 | Binary data in its normal form |

ClassID Length gives the length of the following ClassID character string. If ClassID Length is 0, then this object is exactly an instance of the column type class (from the FORMAT) stream, and the following ClassID token will be missing. ClassID has the same meaning as ClassID from the Format token, but indicates the specific subclass that this object is of the declared class for the column. DataLen is a 4-byte field. The high-order bit indicates whether this is the last (0) DataLen/Data pairs, or if there is another DataLen value after the Data array(1). The low-order 31 bytes is an unsigned length of the following Data array.

Data is a byte array which contains the serialized value of the object. The DataLen/Data pairs continue until a DataLen with a clear high-bit is seen. If that final DataLen has a value of 0 then no additional Data array follows it (acting as sort of a NULL terminated data stream). This allows the system to pass objects of arbitrary size without having to first know how large these objects are). A value of 0x80000000 is legal, and means simply that the length of the following Data stream is 0, and thus the next item will be another 4-byte DataLen. There is no requirement that the lengths of the stream of Data chunks be the same.

E. JDBC Driver Architecture and Operation

In the JDBC driver implementation, for each TDS token type (in the TDS token stream) there is a corresponding Java class. A token represents a unit of data exchange within a TDS stream. Each Java class, in turn, knows how to read data off of the network and convert it into an object that represents a specific TDS token. For instance, the fields of the token are typically represented as members in the corresponding class. In this fashion, the JDBC driver may be implemented as a collection of Java classes, each class for a particular TDS token type.

Referring back to FIG. 2, during system operation, the application 210 invokes the Java SQL driver manager to allocate a connection; each JDBC driver itself can open one or more connections to databases. In response to the allocation request, the driver manager 220 determines what JDBC drivers are installed and locates one that can connect in the manner required by the client application 210 (i.e., based on the client-requested address). For instance, for the environment 200 the driver manager 220 would locate the driver 325. The driver 230, in turn, would return a JConnect connection object to the client application 210. Through the connection object, the client application 210 may invoke various database services. For instance, the client application 210 may allocate a statement from the connection object, for transmitting a query statement for execution. Here, each connection can have one or more associated statements (i.e., queries). If, for example, the query statement specifies a SELECT, the back-end database server will, in response to executing the query, return rows—a result set. In this case, a corresponding "execute query" method on statement returns a result set, another object (i.e., a result set object). The result set itself acts like a cursor. It includes a "next" method, for iterating forward through the rows.

Additionally, as described below, "get data type" methods are provided for retrieving data types, including "get stream", "get char", "get int", and the like, with column name or column number being provided as an input argument. Any required conversion is performed, as necessary.

As part of the standard JDBC interface, the result set class includes a "get object" method. The method is declared to return just the base class for all Java objects (i.e., java.lang class). As java.lang itself is not usually of interest, the "get object" method typically returns an object that is closer to the actual type (of data). For example, if the "get object" method is used on a char (character) column, a string object would typically be returned. In the system of the present invention, if the SQL query selects a Java object column from a table, a call to "get object" will cause the system to return that exact Java object.

The basic process is as follows. The SQL query (execute query statement) from the client is, in effect, handed over to a TDS processing layer (i.e., the network protocol driver within the JDBC driver) which, in response, constructs a TDS language token. Here, the processing layer knows how to create and send a language command to the database server using a streaming protocol (e.g., Sybase TDS protocol). Additionally, it knows how to process results, as they come back from the server. At the JDBC API layer, when an application invokes statement.execute <query>, the statement object invokes the TDS processing layer for sending the language request. Then, the statement object then invokes the result fetching mechanism in the TDS processing layer, for fetching results as they come back from the database server. The statement object will continue processing results until it encounters a "row format" result—that is, a description of all of the columns in the result set. According to the present invention, this description is capable of describing a streaming object, such as a streaming Java object of a specific parent class. At that point, the statement object will cease processing results and will create a new result set object, passing it the column format result or description. Now, the result set can set itself to know how many columns there are, what are the names of the columns, what are the types of the columns, what tables do the columns come from, or the like. The result set object at this point is ready to be returned to the application. The application may now call through the result set object for navigating the result set. First, the application calls "next" to advance to the first row. The result set object will communicate with the TDS processing layer, to process the result until it sees the beginning of the first row. At that point, it will return "true" for indicating that there exists at least one row. Thereafter, the application can retrieve individual column objects, for example: ResultSet.getObject("column1");. The result set class will then look at the types. When it sees that the data type is actually a Java object type for that column, it will create a blob input stream (piped I/O stream) on the TDS network stream that is currently being read. That, in turn, is passed as a constructor to Java I/O object input stream, calling the I/O input stream's "get read object" method. The Sun Java serialization (as specified in the Java language documentation) may then be employed to extract the bits that represent the object (in the stream) out into a "living" or real object, which then may be returned to the client. As each row is read, the system can determine what specific subclass of that parent class (that applies to the column) the row's object is.

F. Trace (token traffic) Example

The following is an example scenario between a desktop client (e.g., Sybase Interactive SQL or Isql utility) connected via a JDBC driver to a database server which has an "object32" stored procedure defined on it. The object32 procedure returns a result set of 3 columns×2 rows. The first and third columns are of type Java object, the 2nd column is a simple integer. The screen display is as follows:

```
Enter a query:
1 > object32
------------------ Result set 1 ----------------------
Columns:
[ 1]     Hi, I'm an TestObject and my value is 0 0     Hi, I'm an
TestObject and my value is 0
[ 2]     Hi, I'm an TestObject and my value is 1 1     Hi, I'm an
TestObject and my value is 10000
```

The corresponding TDS traffic between the Isql utility and the Server is shown below. The first part of the output is a "standard" login sequence. Here, new capability bits are provided to indicate the desire of the client (Isql) to send and receive Java object data items, and the server's indication that it can handle this type of data.

```
Version [2]:                 1
Time [2]:                    885842144
Program Name [256]:          Capture
Input Port No. [2]:          0
Output Port No. [2]:         0
Client Name [256]:           jConnect Application
Server Name [256]:           Application Server
*** LOGIN packet from Client
PDU Header
  TDS Packet Type [1]:       BUF_LOGIN (0x02)
  Status [1]:                BUFSTAT_BEGIN (0x00)
  Length [2]:                512
  Channel [2]:               0
  Packet No. [1]:            0
  Window [1]:                0
PDU Header
  TDS Packet Type [1]:       BUF_LOGIN (0x02)
  Status [1]:                BUFSTAT_EOM (0x01)
  Length [2]:                93
  Channel [2]:               0
  Packet No. [1]:            0
  Window [1]:                0
Login Record; fixed length.
  Host Name [30]:            " "
  Host Name Length [1]:      0
  User Name [30]:            "guest"
  User Name Length [1]:      5
  Password [30]:             "sybase"
  Password Length [1]:       6
  Host Process [30]:         " "
  Host Process Length [1]:   1
  Byte Ordering - int2 [1]:  2
  Byte Ordering - int4 [1]:  0
  Character Encoding [1]:    6
  Float Format [1]:          4
  Date Format [1]:           8
  lusedb [1]:                0x01
  ldmpld [1]:                1
  linterfacespare [1]:       0x00
  Dialog Type [1]:           0
  lbufsize [1]:              512
  spare [3]:                 0x000000
  Application Name [30]:     " "
  Application Name Length [1]: 0
  Service Name [30]:         " "
  Service Name Length [1]:   0
  Remote Passwords [255]:
  Remote Passwords Length [1]: 0
  TDS Version [4]:           5.0.0.0
  Prog Name [30]:            "jConnect"
  Prog Name Length [1]:      8
  Prog Version [4]:          0.4.0.0
```

-continued

| | |
|---|---|
| Convert Shorts [1]: | 0 |
| 4-byte Float Format [1]: | 12 |
| 4-byte Date Format [1]: | 16 |
| Language [30]: | "us_english" |
| Language Length [1]: | 10 |
| Notify when Changed [1]: | 0 |
| Old Secure Info [2]: | 0x0000 |
| Secure Login Flags [1]: | UNUSED (0x00) |
| Bulk Copy [1]: | 0 |
| Spare [9]: | 0x000000000000000000 |
| Character Set [30]: | "iso_1" |
| Character Set Length [1]: | 5 |
| Notify when Changed [1]: | 1 |
| Packet Size [6]: | 512 |
| Packet Size Length [1]: | 3 |

CAPABILITY Token (0xE2); variable length.
    Length [2]:    18
    Type [1]:    CAP_REQUEST
    Mask [7]:
0x6F (01101111): (OBJECT_CHAR), OBJECT_JAVA1, DOL_BULK, (DATA_VOID), DATA_INT8, DATA_BITN, DATA_FLTN, PROTO_DYNPROC
0xE5 (11100101): PROTO_DYNAMIC, DATA_BOUNDARY, DATA_SENSITIVITY, (REQ_URGEVT), (PROTO_BULK), PROTO_TEXT, (CON_LOGICAL), CON_INBAND
0x01 (00000001): (CON_OOB), (CSR_MULTI), (CSR_REL), (CSR_ABS), (CSR_LAST), (CSR_FIRST), (CSR_PREV), DATA_MONEYN
0xFF (11111111): DATA_DATETIMEN, DATA_INTN, DATA_LBIN, DATA_LCHAR, DATA_DEC, DATA_IMAGE, DATA_TEXT, DATA_NUM
0xFF (11111111): DATA_FLT8, DATA_FLT4, DATA_DATE4, DATA_DATE8, DATA_MNY4, DATA_MNY8, DATA_VBIN, DATA_BIN
0xFF (11111111): DATA_VCHAR, DATA_CHAR, DATA_BIT, DATA_INT4, DATA_INT2, DATA_INT1, REQ_PARAM, REQ_MSG
0xD6 (11010110): REQ_DYNF, REQ_CURSOR, (REQ_BCP), REQ_MSTMT, (REQ_EVT), REQ_RPC, REQ_LANG, (NONE)
    Type [1]:    CAP_RESPONSE
    Mask [7]:
0x00 (00000000):
0x00 (00000000):
0x06 (00000110): (OBJECT_NOBINARY), (DATA_NOZEROLEN), (OBJECT_NOCHAR), (OBJECT_NOJAVA1), (DATA_NOINT8), RES_NOSTRIPBLANKS, RES_NOTDSDEBUG, (DATA_NOBOUNDARY)
0x48 (01001000): (DATA_NOSENSITIVITY), PROTO_NOBULK, (PROTO_NOTEXT), (CON_NOINBAND), CON_NOOOB, (DATA_NOMONEYN), (DATA_NODATETIMEN), (DATA_NOINTN)
0x00 (00000000): (DATA_NOLBIN), (DATA_NOLCHAR), (DATA_NODEC), (DATA_NOIMAGE), (DATA_NOTEXT), (DATA_NONUM), (DATA_NOFLT8), (DATA_NOFLT4)
0x00 (00000000): (DATA_NODATE4), (DATA_NODATE8), (DATA_NOMNY4), (DATA_NOMNY8), (DATA_NOVBIN), (DATA_NOBIN), (DATA_NOVCHAR), (DATA_NOCHAR)
0x08 (00001000): (DATA_NOBIT), (DATA_NOINT4), (DATA_NOINT2), (DATA_NOINT1), RES_NOPARAM, (RES_NOEED), (RES_NOMSG), (NONE)

*** NORMAL packet from Server
PDU Header
    TDS Packet Type [1]:    BUF_NORMAL (0x0F)
    Status [1]:    BUFSTAT_EOM (0x01)
    Length [2]:    54
    Channel [2]:    0
    Packet No. [1]:    0
    Window [1]:    0
LOGINACK Token (0xAD); variable length.
    Length [2]:    13
    Status [1]:    LOG_SUCCEED (0x05)
    TDS Version [4]:    5.0.0.0
    Program Name Length [1]:    3
    Program Name [3]:    "RAI"
    Program Version [4]:    1.1.0.0
CAPABILITY Token (0xE2); variable length.
    Length [2]:    18
    Type [1]:    CAP_REQUEST
    Mask [7]:

-continued

0x40 (01000000): (OBJECT_CHAR), OBJECT_JAVA1, (DOL_BULK), (DATA_VOID), (DATA_INT8), (DATA_BITN), (DATA_FLTN), (PROTO_DYNPROC)
0x05 (00000101): (PROTO_DYNAMIC), (DATA_BOUNDARY), (DATA_SENSITIVITY), (REQ_URGEVT), (PROTO_BULK), PROTO_TEXT, (CON_LOGICAL), CON_INBAND
0x00 (00000000): (CON_OOB), (CSR_MULTI), (CSR_REL), (CSR_ABS), (CSR_LAST), (CSR_FIRST), (CSR_PREV), (DATA_MONEYN)
0x79 (01111001): (DATA_DATETIMEN), DATA_INTN, DATA_LBIN, DATA_LCHAR, DATA_DEC, (DATA_IMAGE), (DATA_TEXT), DATA_NUM
0xE3 (11100011): DATA_FLT8, DATA_FLT4, DATA_DATE4, (DATA_DATE8), (DATA_MNY4), (DATA_MNY8), DATA_VBIN, DATA_BIN
0xFF (11111111): DATA_VCHAR, DATA_CHAR, DATA_BIT, DATA_INT4, DATA_INT2, DATA_INT1, REQ_PARAM, REQ_MSG
0x06 (00000110): (REQ_DYNF), (REQ_CURSOR), (REQ_BCP), (REQ_MSTMT), (REQ_EVT), REQ_RPC, REQ_LANG, (NONE)
    Type [1]:    CAP_RESPONSE
    Mask [7]:
0x00 (00000000):
0x00 (00000000):
0xEE (11101110): OBJECT_NOBINARY, DATA_NOZEROLEN, OBJECT_NOCHAR, (OBJECT_NOJAVA1), DATA_NOINT8, RES_NOSTRIPBLANKS, RES_NOTDSDEBUG, (DATA_NOBOUNDARY)
0x6C (01101100): (DATA_NOSENSITIVITY), PROTO_NOBULK, PROTO_NOTEXT, (CON_NOINBAND), CON_NOOOB, DATA_NOMONEYN, (DATA_NODATETIMEN), (DATA_NOINTN)
0x18 (00011000): (DATA_NOLBIN), (DATA_NOLCHAR), (DATA_NODEC), DATA_NOIMAGE, DATA_NOTEXT, (DATA_NONUM), (DATA_NOFLT8), (DATA_NOFLT4)
0x70 (01110000): (DATA_NODATE4), DATA_NODATE8, DATA_NOMNY4, DATA_NOMNY8, (DATA_NOVBIN), (DATA_NOBIN), (DATA_NOVCHAR), (DATA_NOCHAR)
0x08 (00001000): (DATA_NOBIT), (DATA_NOINT4), (DATA_NOINT2), (DATA_NOINT1), RES_NOPARAM, (RES_NOEED), (RES_NOMSG), (NONE)
DONE Token (0xFD); fixed length.
    Length    [8]
    Status [2]:    DONE_FINAL (0x0000)
    TranState [2]:    TDS_NOT_IN_TRAN (0x0000)
    Count (unused) [4]:    0

This second request/response sequence shows execution of the object32 procedure and return of the result-set with Object (BLOB) columns.

*** NORMAL packet from Client
PDU Header
    TDS Packet Type [1]:    BUF_NORMAL (0x0F)
    Status [1]:    BUFSTAT_EOM (0x01)
    Length [2]:    22
    Channel [2]:    0
    Packet No. [1]:    0
    Window [1]:    0
LANGUAGE Token (0x21); variable length.
    Length [4]:    9
    Status [1]:    UNUSED (0x00)
    Text Length    [8]
    Text [8]:    "object32"
*** NORMAL packet from Server
PDU Header
    TDS Packet Type [1]:    BUF_NORMAL (0x0F)
    Status [1]:    BUFSTAT_EOM (0x01)
    Length [2]:    369
    Channel [2]:    0
    Packet No. [1]:    0
    Window [1]:    0
ROWFMT Token (0xEE);
    Length [2]:    69
    Number of Columns [2]:    3

-continued

| | |
|---|---|
| Column 1 | |
|   Length [1]: | 0 |
|   Status [2]: | <unrecognized> (0x0000) |
|   User Type [4]: | 0x00000000 |
|   Datatype [1]: | BLOB |
|   Max Length [1]: | 0 |
|   Locale Length [1]: | 0 |
| Column 2 | |
|   Length [1]: | 0 |
|   Status [2]: | <unrecognized> (0x0000) |
|   User Type [4]: | 0x00000000 |
|   Datatype [1]: | INTN |
|   Max Length [1]: | 4 |
|   Locale Length [1]: | 0 |
| Column 3 | |
|   Length [1]: | 0 |
|   Status [2]: | <unrecognized> (0x0000) |
|   User Type [4]: | 0x00000000 |
|   Datatype [1]: | BLOB |
|   Max Length [1]: | 0 |
|   Locale Length [1]: | 0 |
| ROW Token (0xD1); variable length. | |
| Column 1 | |
|   Length | [0] |
|   Data | [Hi, I'm an TestObject and my value is 0] |
| Column 2 | |
|   Length [1]: | 4 |
|   Data [4]: | 0 |
| Column 3 | |
|   Length | [0] |
|   Data | [Hi, I'm an TestObject and my value is 0] |
| ROW Token (0xD1); variable length. | |
| Column 1 | |
|   Length | [0] |
|   Data | [Hi, I'm an TestObject and my value is 1] |
| Column 2 | |
|   Length [1]: | 4 |
|   Data [4]: | 1 |
| Column 3 | |
|   Length | [0] |
|   Data | [Hi, I'm an TestObject and my value is 10000] |
| DONE Token (0xFD); fixed length. | |
|   Length | [8] |
|   Status [2]: | DONE_COUNT (0x0010) |
|   TranState [2]: | TDS_NOT_IN_TRAN (0x0000) |
|   Count [4]: | 2 |

G. Overall Methodology Description

The Tabular Data Stream (TDS) protocol and supporting C and Java software libraries are extended in the following ways: At the outset, the system creates a "chunked" data type so that within the TDS stream the system can have individual data items which are themselves streams of indeterminate length. This streaming data type is an undifferentiated data type or "BLOB." Using the BLOB extension, the system provides a set of BLOB subtypes which take advantage of existing streaming mechanism (e.g., Java streaming) but convey additional information in the form of self-describing metadata (which precedes all TDS data types). This extended metadata is present in ROW_FORMAT and PARAM_FORMAT tokens. This metadata contains all necessary information on the BLOB data for clients and servers to narrow the BLOB data itself to the appropriate subtype and extract the semantically correct values from it.

One of the BLOB subtypes is defined as JAVA_OBJECT1—meaning that the BLOB data contains the serialized value of a Java object using the version 1 serialization format as defined Java. Additionally, the capabilities negotiation of the existing login sequence is extended so that the client and server sides of a TDS connection can be sure when it is appropriate to send JAVA_OBJECT1 data. In this manner, client and server products can now use this extended version of TDS to exchange serialized Java objects as parameters or row data.

H. Source Code Implementation

Appended herewith are Java source code listings (submitted on compact disc as Appendix A) providing further description of the present invention. A suitable Java development environment for compiling the source code listings is available from a variety of vendors, including Sybase Power J™ (Sybase, Inc. of Emeryville, Calif.), Symantec Cafe™ (Symantec of Cupertino, California), Borland JBuilder™ (Inprise Corporation of Scotts Valley, California), and Microsoft Visual J++™ (Microsoft Corporation of Redmond, Wash.).

I. Advantages

A particular advantage of the approach adopted by the present invention is that changes to objects may occur in a manner that will not break client applications, since the objects themselves "live" or reside at the database. In the face of an object change, a client application using data objects will continue to work correctly if the object's behavior is upwardly compatible with its older behavior. Moreover, as the objects are Java objects, they may be used in conjunction with existing standard Java tools, including the aforementioned Sybase Power J™, Symantec Cafe™, Borland JBuilder™, and Microsoft Visual J++™.

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. A distributed computing system comprising:

a client in communication with a server;

an executable object stored as column data in a database table residing on the server;

means for generating a request at the client for retrieving the executable object, said request including a request to transport to the client the executable object by streaming the executable object to the client;

means, responsive to said request, for streaming said executable object from the server to the client; and means for extracting said executable object from the stream at the client.

2. The system of claim 1, wherein said means for streaming includes means for streaming additional information allowing the executable object to be extracted by the client from a stream.

3. The system of claim 1, further comprising:

additional clients, each of which may request that the executable object be streamed to it.

4. The system of claim 1, further comprising:

additional servers, each of which maintains a database table storing one or more executable objects that may be streamed to the client.

5. An improved distributed computing system, said system including a computer network having a database server and a client capable of retrieving an executable object stored in a database table residing on the database server, said system including an improvement comprising:

a streaming protocol for effecting communication between the client and the database server, wherein said protocol supports streaming of objects, and wherein said protocol conveys information sufficient for extracting an executable object from a stream; and an interface for receiving from the client a request for retrieving information from the database server, said request including a request to transport to the client a particular executable object stored at the database table and, in response to the request, streaming said particular executable object to the client, together with set information sufficient for extracting said particular executable object from the stream, wherein upon receipt of the stream at the client, a local copy of said particular executable object is recreated at the client.

6. The system of claim 5, wherein said particular executable object is a Java object.

7. The system of claim 6, wherein said Java object includes instantiated Java class data members and class methods.

8. The system of claim 5, wherein said database table comprises a relational database table.

9. The system of claim 5, wherein said request comprises an SQL query received from the client.

10. The system of claim 5, wherein said additional information comprises row format tokens allowing the client to extract as row format data semantically correct values for the particular executable object being streamed.

11. The system of claim 10, wherein said row format tokens specify at least a column name and data type for conveying column format information to a client.

12. The system of claim 5, wherein said additional information comprises parameter format tokens allowing the client to extract as parameter format data semantically correct values for the particular executable object being streamed.

13. The system of claim 5, wherein said client comprises a database application executing at a client machine.

14. The system of claim 5, wherein said protocol supports streaming of individual data items which are themselves streams of indeterminate length.

15. The system of claim 5, wherein said protocol includes support for ANSI SQL-92 data types.

16. The system of claim 5, wherein said protocol comprises a token-based protocol.

17. The system of claim 5, wherein said protocol operates in conjunction with a connection-oriented transport service.

18. The system of claim 5, wherein said executable object comprises a Java object stored as column data in the database table.

19. The system of claim 5, wherein the particular executable object is retrieved from the stream as an output parameter of a stored procedure.

20. The system of claim 5, wherein the particular executable object received in the result set is assigned to a class variable declared at the client.

21. An improved distributed computing system, said system including a computer network having a database server and a client capable of retrieving an executable object stored in a database table residing on the database server, said system including an improvement comprising:

a streaming protocol for effecting communication between the client and the database server, wherein said protocol supports streaming of objects, and wherein said protocol conveys information sufficient for extracting an executable object from a stream; and an interface for receiving from the client a request for retrieving information from the database server, said request including a request to transport to the client a particular executable object stored at the database table and, in response to the request, streaming said particular executable object to the client, together with set information sufficient for extracting said particular executable object from the stream, wherein upon receipt of the stream at the client, a local copy of said particular executable object is recreated at the client;

wherein said objects comprise binary-large-objects.

22. An improved distributed computing system, said system including a computer network having a database server and a client capable of retrieving an executable object stored in a database table residing on the database server, said system including an improvement comprising:

a streaming protocol for effecting communication between the client and the database server, wherein said protocol supports streaming of objects, and wherein said protocol conveys information sufficient for extracting an executable object from a stream; and an interface for receiving from the client a request for retrieving information from the database server, said request including a request to transport to the client a particular executable object stored at the database table and, in response to the request, streaming said particular executable object to the client, together with set information sufficient for extracting said particular executable object from the stream, wherein upon receipt of the stream at the client, a local copy of said particular executable object is recreated at the client;

wherein said protocol further provides login capability that allows the client and database server to ascertain conditions appropriate for streaming executable objects.

23. An improved distributed computin system, said system including a computer network having a database server and a client capable of retrieving an executable object stored in a database table residing on the database server, said system including an improvement comprising:

a streaming protocol for effecting communication between the client and the database server, wherein said protocol supports streaming of objects, and wherein said protocol conveys information sufficient for extracting an excutable object from a stream; and an interface for receiving from the client a request for retrieving information from the database server, said request including a request to transport to the client a particular executable object stored at the database table and, in response to the request, streaming said particular executable object to the client, together with set information sufficient for extracting said particular executable object from the stream, wherein upon receipt of the stream at the client, a local copy of said particular executable object is recreated at the client;

wherein said objects are strained using a streaming-chunked data type that may be employed to represent a serialized object.

24. The system of claim 23, wherein said streaming-chunked data type is associated with a blob type first indicating what type of serialized data comprises the streamed object.

25. In a system comprising a computer network having a database server and a client, an improved method for allowing a client to retrieve an executable object stored in a database table residing on a database server, the method comprising:

providing a streaming protocol for effecting communication between the client and the database server, wherein said protocol supports streaming of an undifferentiated data type, and wherein said protocol provides subtypes providing metadata that conveys additional information for extracting an executable object from a stream;

receiving from the client a request for retrieving information from the database server, said request including a request to transport to the client a particular executable object stored at the database table;

in response to the request, retrieving a result set from the database server corresponding to the requested particular executable object;

streaming said result set to the client, said result set including the particular executable object together with corresponding metadata; and upon receipt of the result set at the client, using said metadata for recreating at the client a local copy of said particular executable object.

26. The method of claim 25, wherein said particular executable object is a Java object.

27. The method of claim 26, wherein said Java object includes instantiated Java class data members and class methods.

28. The method of claim 25, wherein said database table comprises a relational database table.

29. The method of claim 25, wherein said request comprises an SQL query received from the client.

30. The method of claim 25, wherein said metadata comprises row format tokens allowing the client to extract as row format data semantically correct values for the particular executable object being streamed.

31. The method of claim 30, wherein said row format tokens specify at least a column name and data type for conveying column format information to a client.

32. The method of claim 25, wherein said metadata comprises parameter format tokens allowing the client to extract as parameter format data semantically correct values for the particular executable object being streamed.

33. The method of claim 25, wherein said client comprises a database application executing at a client machine.

34. The method of claim 25, wherein said protocol supports streaming of individual data items which are themselves streams of indeterminate length.

35. The method of claim 25, wherein said protocol includes support for ANSI SQL-92 data types.

36. The method of claim 25, wherein said protocol comprises a token-based protocol.

37. The method of claim 25, wherein said protocol operates in conjunction with a connection-oriented transport service.

38. The method of claim 25, wherein said executable object comprises a Java object stored as column data in the database table.

39. The method of claim 25, further comprising:
retrieving the particular executable object alternatively as an output parameter of a stored procedure.

40. The method of claim 25, further comprising:
assigning the particular executable object received in the result set to a class variable declared at the client.

41. In a system comprising a computer network having a database server and a client, an improved method for allowing a client to retrieve an executable object stored in a database table residing on a database server, the method comprising:
providing a streaming protocol for effecting communication between the client and the database server, wherein said protocol supports streaming of an undifferentiated data type, and wherein said protocol provides subtypes providing metadata that conveys additional information for extracting an executable object from a stream;
receiving from the client a request for retrieving information from the database server, said request including a request to transport to the client a particular executable object stored at the database table;
in response to the request, retrieving a result set from the database server corresponding to the requested particular executable object;
streaming said result set to the client, said result set including the particular executable object together with corresponding metadata; and
upon receipt of the result set at the client, using said metadata for recreating at the client a local copy of said particular executable object;
wherein said undifferentiated data type comprises a binary-large-object data type.

42. In a system comprising a computer network having a database server and a client, an improved method for allowing a client to retrieve an executable object stored in a database table residing on a database server, the method comprising:
providing a streaming protocol for effecting communication between the client and the database server, wherein said protocol supports streaming of an undifferentiated data type, and wherein said protocol provides subtypes providing metadata that conveys additional information for extracting an executable object from a stream;
receiving from the client a request for retrieving information from the database server, said request including a request to transport to the client a particular executable object stored at the database table;
in response to the request, retrieving a result set from the database server corresponding to the requested particular executable object;
streaming said result set to the client, said result set including the particular executable object together with corresponding metadata; and
upon receipt of the result set at the client, using said metadata for recreating at the client a local copy of said particular executable object;
wherein said protocol further provides login capability that allows the client and database server to ascertain conditions appropriate for streaming executable objects.

43. In a system comprising a computer network having a database server and a client, an improved method for allowing a client to retrieve an executable object stored in a database table residing on a database server, the method comprising:
providing a streaming protocol for effecting communication between the client and the database server, wherein said protocol supports streaming of an undifferentiated data type, and wherein said protocol provides subtypes providing metadata that conveys additional information for extracting an executable object from a stream;
receiving from the client a request for retrieving information from the database server, said request including a request to transport to the client a particular executable object stored at the database table;
in response to the request, retrieving a result set from the database server corresponding to the requested particular executable object;
streaming said result set to the client, said result set including the particular executable object together with corresponding metadata; and
upon receipt of the result set at the client, using said metadata for recreating at the client a local copy of said particular executable object;
wherein said undifferentiated data type comprises a streaming-chunked data type that may be employed to represent a serialized object.

44. The method of claim 43, wherein said streaming-chunked data type is associated with a blob type field indicating what type of serialized data comprises the streamed object.

45. The method of claim 43, wherein said streaming-chunked data type is associated with a serialization type field indicating how the streamed object is actually being represented in the stream.

* * * * *